United States Patent
Toussaint et al.

(10) Patent No.: US 10,495,531 B2
(45) Date of Patent: Dec. 3, 2019

(54) FORCE SENSOR

(71) Applicants: MUSEUM NATIONAL D'HISTOIRE NATURELLE, Paris (FR); CENTRE NATIONAL DE LA RECHERCHE SCIENTIFIQUE, Paris (FR); UNIVERSITE PIERRE ET MARIE CURIE (PARIS 6), Paris (FR); UNIVERSITE PARIS DIDEROT—PARIS 7, Paris (FR)

(72) Inventors: Séverine Toussaint, Paris (FR); Artémis Llamosi, Paris (FR)

(73) Assignees: MUSEUM NATIONAL D'HISTOIRE NATURELLE, Paris (FR); CENTRE NATIONAL DE LA RECHERCHE SCIENTIFIQUE, Paris (FR); SORBONNE UNIVERSITE, Paris (FR); UNIVERSITE PARIS DIDEROT-PARIS 7, Paris (FR)

( * ) Notice: Subject to any disclaimer, the term of this patent is extended or adjusted under 35 U.S.C. 154(b) by 0 days.

(21) Appl. No.: 15/752,415

(22) PCT Filed: Aug. 11, 2016

(86) PCT No.: PCT/EP2016/069186
§ 371 (c)(1),
(2) Date: Feb. 13, 2018

(87) PCT Pub. No.: WO2017/025616
PCT Pub. Date: Feb. 16, 2017

(65) Prior Publication Data
US 2019/0011317 A1   Jan. 10, 2019

(30) Foreign Application Priority Data
Aug. 13, 2015 (FR) ..................... 15 57723

(51) Int. Cl.
G02B 6/00 (2006.01)
G01L 1/24 (2006.01)

(52) U.S. Cl.
CPC .............. *G01L 1/243* (2013.01); *G01L 1/247* (2013.01); *G01L 5/166* (2013.01)

(58) Field of Classification Search
CPC ......... G01L 1/246; G01L 1/242; G02B 6/022; G02B 6/00; G01H 9/004
See application file for complete search history.

(56) References Cited

U.S. PATENT DOCUMENTS

| 4,599,908 A | 7/1986 | Sheridan et al. |
| 5,425,273 A | 6/1995 | Chevalier |
| (Continued) | | |

FOREIGN PATENT DOCUMENTS

| EP | 1 321 753 A1 | 6/2003 |
| EP | 1 757 917 A1 | 2/2007 |
| (Continued) | | |

OTHER PUBLICATIONS

International Search Report, dated Nov. 22, 2016, from corresponding PCT/EP2016/069186 application.

*Primary Examiner* — Jennifer Doan
(74) *Attorney, Agent, or Firm* — Young & Thompson

(57) ABSTRACT

Disclosed is a force sensor, including: at least one measurement cell, each measurement cell being filled with a filling material in which at least one inclusion of a substance is embedded; for each cell, at least one light source arranged in order to illuminate the inclusion embedded in this cell; for each cell, a measurement system including at least one optical measurement point arranged in order to capture light originating from the inclusion embedded in this cell; for each cell, a unit arranged in order to convert optical signals originating from the measurement system of this cell to a signal representative of a force exerted on this cell, this (Continued)

Figure 5:
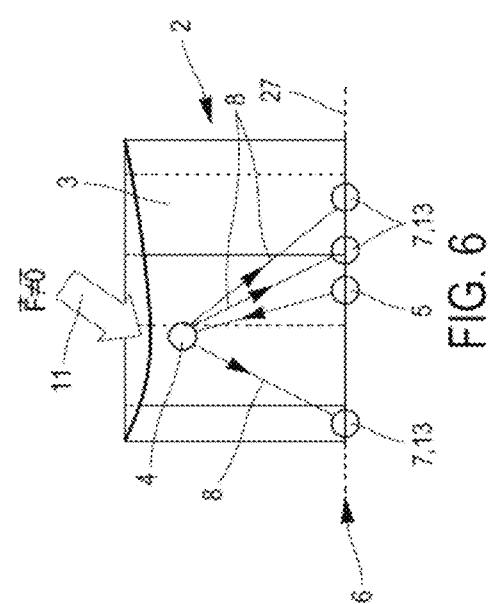

signal being dependent on a movement of the inclusion embedded within the filling material of this cell.

20 Claims, 3 Drawing Sheets

(56) References Cited

U.S. PATENT DOCUMENTS

| | | |
|---|---|---|
| 7,903,907 B1 | 3/2011 | Park et al. |
| 2007/0040107 A1* | 2/2007 | Mizota ............... B25J 13/084 250/221 |
| 2014/0182391 A1 | 7/2014 | Huang et al. |

FOREIGN PATENT DOCUMENTS

| | | |
|---|---|---|
| JP | H09 257609 A | 10/1997 |
| WO | 86/03618 A1 | 6/1986 |
| WO | 92/02796 A1 | 2/1992 |
| WO | 2005/029028 A1 | 3/2005 |
| WO | 2013/072712 A1 | 5/2013 |

* cited by examiner

FORCE SENSOR

TECHNICAL FIELD

The present invention relates to a force sensor. It also relates to a method implemented by such a force sensor.

Such a sensor preferably allows a user to carry out a dynamic and spatially resolved measurement of the intensity and the direction of the force, preferably even under difficult measurement conditions and using numerous possible forms of sensors.

STATE OF THE PRIOR ART

Force sensors according to the state of the art are known.

Some of these sensors are mechanical and measure forces, for example using spring systems. A spring makes it possible to measure an intensity but not the direction of a force and does not have satisfactory reactivity for dynamic measurements at 60 Hz for example.

Other sensors are electronic and measure forces for example via capacitive effects. This type of sensor needs to be kept dry and is manufactured in the form of a plate or film.

The purpose of the present invention is to propose a force sensor which makes it possible to solve at least one of the following problems:
- Allowing a measurement of force in terms of both intensity and direction, and/or
- Measuring forces in a spatially resolved manner, i.e. providing access to the spatial distribution of the forces applied to the sensor at several points of this sensor, preferably with a spatial resolution of less than a centimetre, and/or
- Allowing a measurement of dynamic force, and/or
- Improving the robustness of the force measurement technology in order to allow the sensor to operate under difficult conditions (humidity, strong magnetic field etc.), and/or
- Proposing a force measurement technology which allows significant flexibility regarding choice of the form of the sensor, without necessarily having to be limited to a "plate" or "film" form.

DISCLOSURE OF THE INVENTION

This objective is achieved with a force sensor according to the invention, comprising:
- at least one measurement cell (preferably a wall comprising an array of measurement cells), each measurement cell being filled with a filling material in which at least one inclusion of a substance is embedded,
- for each cell, at least one light source arranged in order to illuminate the at least one inclusion embedded in this cell,
- for each cell, a measurement system comprising at least one optical measurement point arranged in order to capture light originating from the at least one inclusion embedded in this cell,
- for each cell, means arranged in order to convert optical signals originating from the measurement system of this cell to a signal representative of a force exerted on this cell, this signal being dependent on a movement of the at least one inclusion embedded within the filling material of this cell.

For each cell, the measurement system associated with this cell can comprise at least three distinct optical measurement points arranged in order to capture light originating from the at least one inclusion embedded in this cell, preferably at least one (preferably at least three) distinct optical measurement point(s) per inclusion embedded within the filling material of this cell, the at least one (preferably at least three) optical measurement point(s) associated with a given inclusion being arranged in order to capture light originating from this given inclusion.

The force sensor according to the invention can comprise a two-dimensional array of cells.

The optical measurement point or points of each cell are preferably distinct from the measurement point or points of each of the other cells.

Each optical measurement point can comprise a distal end of a detection optical fibre. Each detection optical fibre can comprise:
- its distal end oriented towards a cell with which it is associated, and
- a proximal end oriented towards an optical sensor arranged in order to convert an optical signal originating from this detection optical fibre to an electrical signal, the conversion means comprising said optical sensor.

The force sensor according to the invention can comprise at least one distinct light source per cell, preferably one distinct light source per cell or one distinct light source per inclusion in this cell. This light source can comprise a distal end of an illumination optical fibre. Each illumination optical fibre can comprise:
- its distal end oriented towards a cell with which it is associated, and
- a proximal end orientated towards light generation means, said light generation means being common to all of the illumination optical fibres.

The force sensor according to the invention can comprise several cells distributed in a wall, said wall comprising:
- a first face arranged for the exertion of one or more forces measured by the force sensor, and
- a second face comprising passages for the insertion of the distal end of each detection and/or illumination optical fibre.

The signal representative of a force exerted on a cell can comprise an intensity of this force and/or a direction of this force.

The, or the at least one of (or preferably each of) the inclusion(s) embedded in each cell is preferably a solid and/or spherical object, preferably a bead.

For each cell:
- the at least one (preferably each) inclusion embedded in this cell can be fluorescent so as to emit an optical fluorescence signal following excitation with an excitation wavelength emitted by the light source(s) arranged in order to illuminate the at least one inclusion embedded in this cell, the fluorescence signal having a fluorescence wavelength distinct from the excitation wavelength,
- the conversion means can comprise a filter arranged in order to filter out the excitation wavelength and allow the fluorescence wavelength to pass through.

The conversion means can comprise a single optical sensor for all of the cells, said optical sensor being arranged in order to convert an optical signal originating from any optical measurement point of any cell to an electrical signal.

According to yet another aspect of the invention, a force measurement method according to the invention is proposed (preferably implemented in a sensor according to the invention), comprising:

exertion of a force on at least one measurement cell (preferably on a wall comprising an array of measurement cells), the force being able to vary from one cell to another, each measurement cell being filled with a filling material in which at least one inclusion of a substance is embedded, for each cell, illumination of the at least one inclusion embedded in this cell by at least one light source, for each cell, capture of light originating from the at least one inclusion embedded in this cell, by means of a measurement system comprising at least one optical measurement point, for each cell, conversion, by conversion means, of optical signals originating from the measurement system of this cell to a signal representative of a force exerted on this cell, this signal being dependent on a movement of the at least one inclusion embedded within the filling material of this cell.

According to the invention:

the conversion can comprise conversion to an electrical signal, by an optical sensor, of an optical signal originating from a detection optical fibre (if these fibres are present) and/or from a measurement point, and/or common generation of light (by generation means) for all of the proximal ends of the illumination optical fibres (if these fibres are present), and/or the exertion of the force is preferably on the first face of the wall in which the cells are distributed, and/or the at least one (preferably each) inclusion embedded in all or some of the cells can be fluorescent, such that the method according to the invention comprises an emission of an optical fluorescence signal by the at least one (preferably each) fluorescent inclusion following excitation with an excitation wavelength emitted by the light source(s) arranged in order to illuminate the at least one inclusion embedded in this cell, the fluorescence signal having a fluorescence wavelength distinct from the excitation wavelength, and the method according to the invention also comprising filtering out (typically by means of an optical filter) of the excitation wavelength so as to eliminate the excitation wavelength and allow the fluorescence wavelength of the optical signal originating from the measurement system of this cell to pass through.

DESCRIPTION OF THE FIGURES AND EMBODIMENTS

Figure 3:
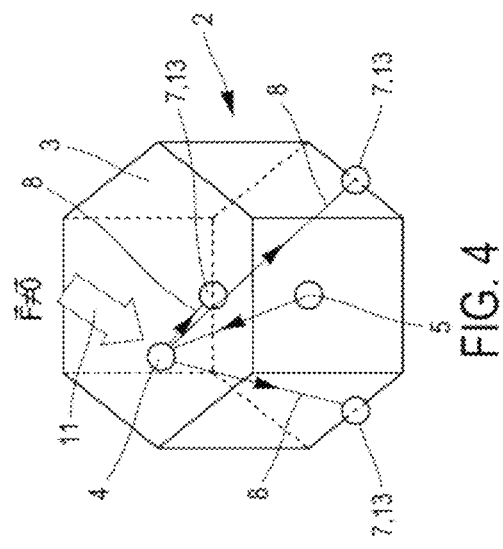
Figure 6:
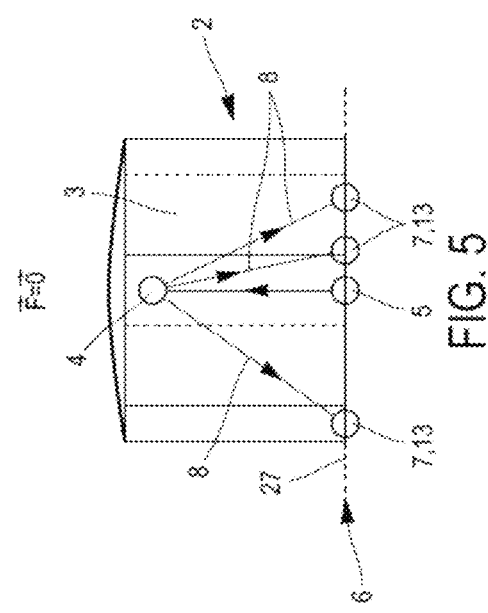
Figure 4:
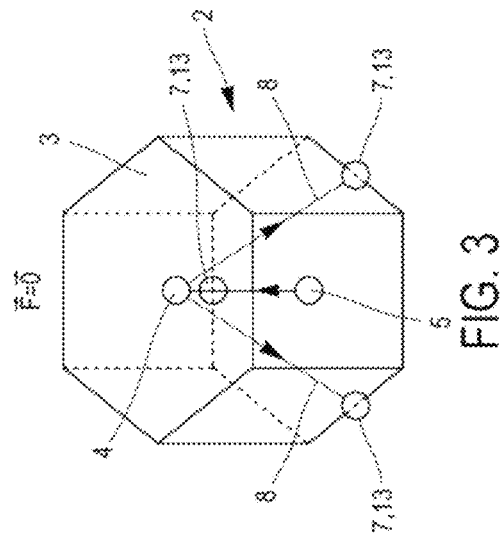
Figure 1:
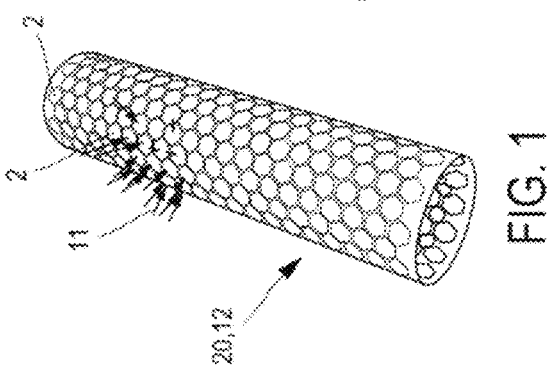
Figure 2:
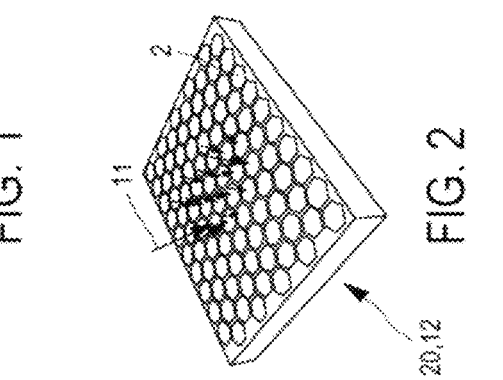
Figure 8:
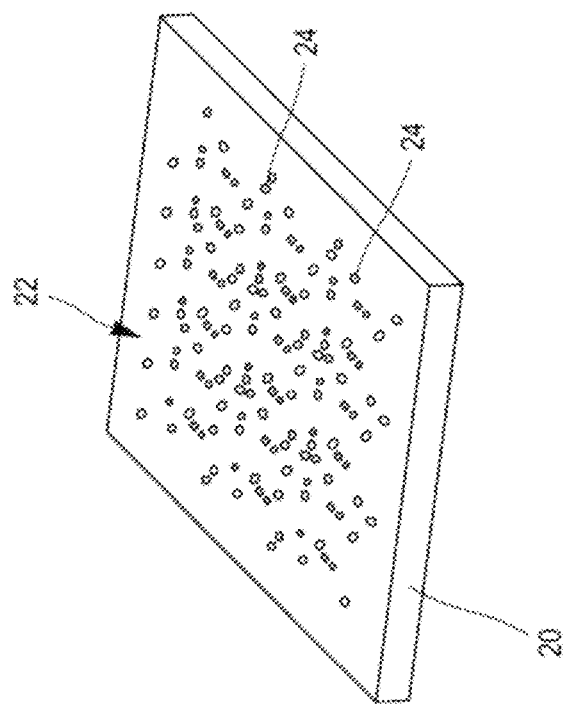
Figure 7:
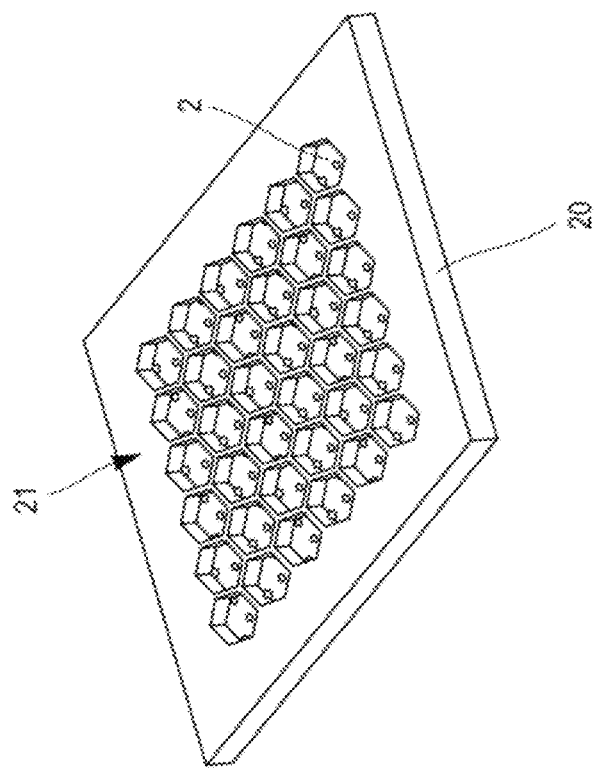
Figure 9:
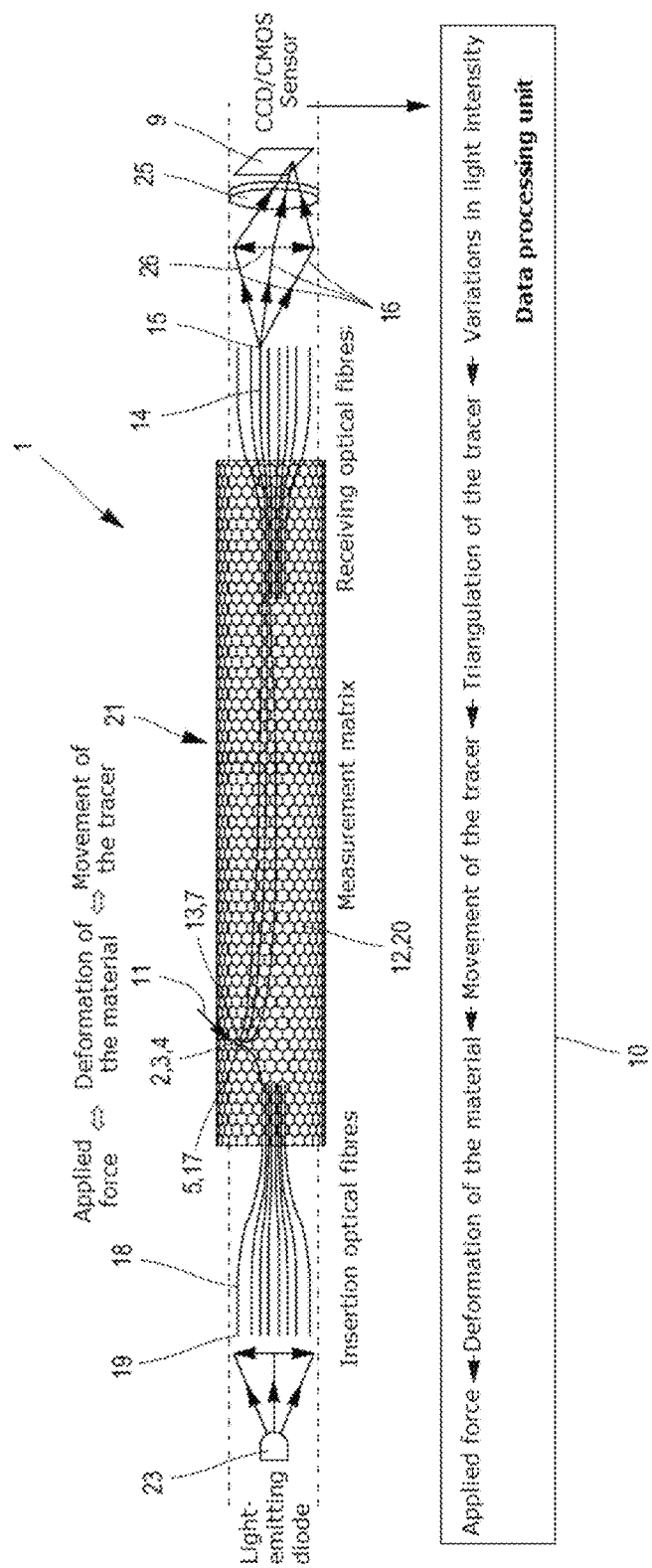

Other advantages and features of the invention will become apparent on reading the detailed description of implementations and embodiments, which is in no way limitative, and the following attached drawings:

FIGS. 1 and 2 show two variants of the form of a two-dimensional array 12 of cells 2 of a first embodiment of the force sensor 1 according to the invention, FIG. 3 is a perspective view of a cell 2 of the first embodiment of sensor 1 according to the invention when no force to be measured is applied to this cell 2, FIG. 4 is a perspective view of the cell 2 of FIG. 3, when a force 11 to be measured is applied to this cell 2, FIG. 5 is a profile view of the cell 2 of FIG. 3, when no force to be measured is applied to this cell 2, FIG. 6 is a profile view of the cell 2 of FIG. 3 when a force 11 to be measured is applied to this cell 2, FIG. 7 is a view of a first face 21 of a wall 20 in which the two-dimensional array 12 of cells 2 of the first embodiment of the sensor 1 according to the invention is distributed in a flat variant with thirty-six cells 2, this first face 21 being arranged for the exertion of one or more forces measured by the sensor 1 according to the invention, FIG. 8 is a view of a second face 22 of the wall 20 in which the two-dimensional array 12 of cells 2 of the first embodiment of sensor 1 according to the invention is distributed in the same flat variant with 36 cells, this second face 22 comprising passages for the insertion of the distal end 13, 17 of detection optical fibres 14 and illumination optical fibres 18, and FIG. 9 is a global diagrammatic view of the different components of the first embodiment of the sensor 1 according to the invention.

As these embodiments are in no way limitative, it will be possible in particular to consider variants of the invention comprising only a selection of characteristics described or illustrated below, in isolation from the other characteristics described or illustrated (even if this selection is isolated within a sentence including these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

First of all, with reference to FIGS. 1 to 9, a first embodiment of sensor 1 according to the invention will be described.

The sensor 1 is a force sensor.

The principle of the first embodiment of the sensor 1 is based on a set of cells 2 filled with an elastic polymer 3, the measurable deformation of which is proportional to the applied force 11. In order to measure the deformation of this material 3, the position of an inclusion 4 included in the material 3 is determined by "triangulation" by means of an optical system.

The sensor 1 comprises at least one measurement cell 2. The sensor 1 comprises several cells 2.

The sensor 1 comprises a two-dimensional array 12 of cells.

Over a surface 21 of distribution of the two-dimensional array 12 of cells 2, cells 2 are hexagonal in form and are in contact with six other adjacent cells 2.

This two-dimensional array 12 and the wall 20 in which this array 12 is distributed does not necessarily have a flat form, but can be in the form of a cylinder, ball etc. In fact, such a wall 20 comprising an array 12 (hexagonal or otherwise) of cells 2 to be filled with the filling material 3 (typically an elastic polymer) can easily be manufactured by 3D printing in any form whatever.

The array 12 is produced by stereolithography 3D printing (or three-dimensional printing) or by machining.

The array 12 is produced from polymer, plastic or metal.

For example, the array 12 is produced by stereolithography 3D printing from polymer, for example from lactic acid polymer (or "LAP"), typically with a resolution of 25 μm. In another variant, the array 12 can also be produced from metal, for example by means of a computer numerically controlled (or "CNC") machine tool.

The wall 20 comprises or forms the array 12 of different cells 2 which are integral.

There is no space between different adjacent cells 2 of the array 12.

The wall 20 or array 12 is therefore made of a material different from the filling material 3 of each cell 2:

either of completely different materials,
or of materials comprising one and the same base but modified in two different ways,
such that these two materials have different mechanical properties (for example, elasticity, flexibility or deformability) and/or optical properties (for example, opacity).

For example, the array 12 can itself also be flexible or deformable, but more opaque than the filling material 3.

An array 12 of cells 2 makes it possible to improve the accuracy of measurement by isolating (optically and/or mechanically) different spatial measurement units (the inclusions 4) from one another, and can mechanically improve the distribution of the residual and collateral forces.

As illustrated in FIGS. 1 and 9, a cylindrical form is preferred, in particular for studying human or animal grip forces.

There are for example variants for which the array 12 has a cylindrical form with the following characteristics:
External diameter: 4 cm; Length: 30 cm; Number of cells: 2156 (28×77); Number of optical fibres (total) 8624; or
External diameter: 2 cm; Length: 13 cm; Number of cells: 476 (14×34); Number of optical fibres (total) 1904.

Each measurement cell 2 is filled with a filling material 3 in which an inclusion 4 of a substance is embedded.

Each cell has a diameter of less than 5 millimetres, i.e. all the filling material 3 of a cell 2 is held completely enclosed in an area delimited by a sphere 5 mm in diameter.

Each cell 2 is a hexagonal cell 4 mm in diameter and with 0.5 mm spacing and with a depth of 3 mm and a floor of 1.5 mm.

The filling material 3 is an elastic material, the deformation of which is preferably linearly proportional to an applied force 11 typically comprised between 0.1 and 40 Newtons.

The filling material 3 is a polymer.

The polymer 3 used is a silicon-containing polymer, polydimethylsiloxane (or "PDMS"), typically with the reference Sylgard 184) the mechanical properties of which have been characterized ("*Mechanical characterization of bulk Sylgard*184 *for microfluidics and microengineering*", I D Johnston, D K McCluskey, C K L Tan and M C Tracey, Journal of Micromechanics and Microengineering, 2014).

The inclusion of a substance 4 can be an object that is solid or other (liquid, gaseous etc.) such as for example a dot of ink limited in an area in the core of the filling material 3, or a bubble of gas, or even a difference in the local optical property within the filling material 3.

In the first embodiment of the sensor 1 shown, the inclusion 4 embedded in each cell 2 is a solid object, more precisely a reflective spherical bead, typically a bead made of white polystyrene.

Each reflective bead 4, serving as a position marker, has a diameter comprised between 250 and 300 µm and is cast in the material 3 of its cell 2, approximately one millimetre below the measurement surface 21.

The inclusion of a substance 4 has optical properties different from those of the filling material 3. In particular, the inclusion of a substance 4 has a refractive index of light (at an excitation wavelength) different from the refractive index (at this same excitation wavelength) of the filling material 3.

The inclusion of a substance is arranged in order to send light 8, i.e. in order to:
reflect light at the excitation wavelength, and/or
diffuse light at the excitation wavelength, and/or
emit light (for example a fluorescence signal) in response to the reception of light at the excitation wavelength.

For each cell 2, the sensor 1 comprises at least one light source 5 arranged in order to illuminate the inclusion 4 embedded in this cell 2.

For each cell 2, the sensor 1 comprises a measurement system 6 comprising at least one optical measurement point 7 arranged in order to capture (reflected, diffused, fluorescence etc.) light 8 originating from the inclusion 4 embedded in this cell 2.

More precisely, in the sensor 1, the measurement system 6 of each cell 2 comprises at least three distinct optical measurement points arranged in order to capture the (reflected, diffused, fluorescence etc.) light 8 originating from the inclusion 4 embedded in this cell 2.

There is therefore at least one distinct measurement point 7 per cell 2, and even at least three distinct measurement points 7 per cell 2.

Each optical measurement point 7 of a cell 2 is distinct from all the measurement points of the other cells.

Each optical measurement point comprises, and even consists of, a distal end 13 (virtually in the form of a point) of a detection optical fibre 14.

There is at least one distinct optical fibre 14 (and therefore at least one distal end 13 of the fibre 14) per cell 2, and even at least three distinct optical fibres 14 (and therefore at least three distal ends 13 of the fibre 14) per cell 2.

Each detection optical fibre 14 comprises:
its distal end 13 oriented towards (and even optionally inserted into) a cell 2 with which it is associated, and
a proximal end 15 oriented towards an optical sensor 9 arranged in order to convert an optical signal 16 (corresponding to the light 8 received at the distal end 13 of this fibre 14) originating from this detection optical fibre 14 into an electrical signal, the conversion means comprising said optical sensor 9.

The bare optical sensor 9 is conjugated by means of a simple convergent lens 26 (with focal length f=25.4 mm) to the proximal ends 15 of the fibres 14.

As the sensor 1 is based on an optical technology, it can have a very rapid acquisition dynamic (compared with a spring), typically of 60 Hz or more. The speed of light is clearly not a limiting factor. The main limiting factor is the model of sensor 9 used. It is possible, for example to use a SONY-brand sensor 9 with the reference IMX174.

The sensor 1 comprises a distinct light source 5 per cell, each source 5 being arranged in order to illuminate the cell 2 with which it is associated without illuminating the other cells 2.

Each light source 5 comprises, and even consists of, a distal end 17 of an illumination optical fibre 18.

Each illumination optical fibre 18 comprises:
its distal end 17 oriented towards a cell 2 with which it is associated; this distal end is more precisely placed centrally at the bottom of the cell with which it is associated, and
a proximal end 19 orientated towards light generation means 23,
said light generation means 23 being common to all of the illumination optical fibres 18.

The generation means 23 comprise a light-emitting diode (or "LED"), for example green, 20 mA.

Thus, as regards the illumination, a single light-emitting diode 23 is used, which is conveyed by fibres 18 to each cell 2 (typically for the illumination "from below" of the bead 4 of each cell 2).

There is a distinct optical fibre 18 (and therefore a distal end 17 of fibre 18) per cell 2.

Each optical fibre 14, 18 has a plastic core, for example 240 μm in diameter and a final diameter of 250 μm. However, glass fibres 14, 18 can also be envisaged.

With reference to FIGS. 7 and 8, it is noted that the sensor 1 comprises several cells 2 distributed in the wall 20 and that the wall 20 comprises:
- a first face 21 arranged for the exertion of one or more forces measured by the sensor 1, and
- a second face 22 (opposite the first face 21) comprising passages 24 (or holes) for the insertion of the distal end 13, 17 of each detection optical fibre 14 and of each illumination optical fibre 18.

Thus, the array 12 or wall 20 comprises holes 24 guiding the insertion of the optical fibres 14, 18. These holes make it possible to ensure the angle that the fibres 14, 18 form with the associated cell 2.

The choice of a hexagonal form for the cells 2 brings together a certain number of advantages:
- it maximizes the measurement surface with respect to the length of the supports (or spacers);
- it allows very good distribution of the residual and collateral forces (i.e. absorbed by the structure);
- the symmetry of the hexagon makes it possible to cover a plane or a curved surface without overlapping of fibres 14 with only two types of distribution of the fibres 14 (and therefore two types of cells) as shown in FIGS. 7 and 8.

For each cell 2, the force sensor 1 comprises conversion means 9, 10 arranged in order to convert optical signals originating from the measurement system 6 of this cell 2 (by a type of "triangulation") to a signal representative of a force 11 exerted on this cell 2, this signal being dependent on a movement (shown in FIG. 6) of the inclusion 4 embedded within the filling material 3 of this cell 2.

The signal representative of a force 11 exerted on a cell 2 comprises an intensity of this force and a direction of this force.

The conversion means 9, 10 comprise the optical sensor 9. The conversion means comprise a single optical sensor 9 for all of the cells 2, said optical sensor 9 being arranged in order to convert an optical signal originating from any optical measurement point 5 of any cell 2 to an electrical signal.

The conversion means also comprise a processing unit 10. The unit 10 comprises a computer, and/or a central or calculation unit, and/or an analogue electronic circuit (preferably dedicated), and/or a digital electronic circuit (preferably dedicated), and/or a microprocessor (preferably dedicated) and/or software means.

The conversion means 9, 10 are arranged in order to convert optical signals originating from the at least three optical measurement points of a cell 2 to a signal representative of a force exerted on this cell 2 at a frequency of at least 1 Hz, typically approximately 60 Hz.

Furthermore, for at least one cell 2 or for each cell 2, the inclusion 4 embedded in this cell is preferably fluorescent so as to emit an optical fluorescence signal following excitation with an excitation wavelength emitted by the light source 5 (and therefore the generation means 23) associated with this cell 2 (i.e. the source arranged in order to illuminate the inclusion 4 embedded in this cell 2), the fluorescence signal having a fluorescence wavelength distinct from the excitation wavelength. In this case, the conversion means 9, 10 also comprise a filter 25 (situated upstream of the optical sensor 9) arranged in order to filter out the excitation wavelength (before the optical sensor 9) and allow the fluorescence wavelength to pass through (up to the optical sensor 9). The use of fluorescent inclusions 4 makes it possible to improve the signal-to-noise ratio.

The force measurement method according to the invention implemented by the sensor 1 comprises:
- exertion of a force on at least one measurement cell 2, the force being able to vary from one cell to another (as shown by the different arrows in FIGS. 1 and 2), each measurement cell being filled with a filling material 3 in which an inclusion of a substance 4 is embedded,
- for each cell 2, illumination of the inclusion 4 embedded in this cell 2 by at least one light source 5,
- for each cell 2, capture of light 8 originating from the inclusion 4 embedded in this cell 2 by a measurement system 6 comprising at least one optical measurement point 7,
- for each cell 2, conversion, by conversion means 9, 10, 25, 26 of the optical signals originating from the measurement system 6 of this cell to a signal representative of a force 11 exerted on this cell 2, this signal being dependent on a movement of the inclusion 4 embedded within the filling material 3 of this cell 2.

In order to determine the position (and therefore the movement) of an inclusion 4 in a cell 2, an approach very similar to triangulation is implemented by the unit 10. The intensity of light received in one of the corners of a cell 2 by a measurement point 7 substantially depends on the distance from the bead 4 to the corner (see FIGS. 4 to 6). Knowing the distance from the inclusion 4 to each of the corners, it is possible to calculate its absolute position, and thus the deformation of the material 3 and therefore the force applied to the cell 2. In order to measure the light intensity at three points of each cell 2, use is not made of three sensors per cell 2 (which would increase the price), but of three optical fibres 14 which convey the light 8 up to the CCD or CMOS optical sensor 9. There is therefore a single optical sensor 9 for all of the cells 2. An algorithm implemented by the unit 10 makes it possible, starting from the measured differences in intensity, to reconstruct, after calibration, the effective force applied to a given cell 2, at a given point in time.

This algorithm will now be described in more detail.

Geometric Notations of a Cell 2 in Question:

Within a cell 2, the detection fibres 14 are placed at the three points of an equilateral triangle of side a. This triangle has a circumscribed circle merged with the circle inscribed in a hexagonal cell of width a and depth h.

The space is provided with an orthonormal mark centred on a fibre, the $\vec{x}$ and $\vec{y}$ axes of which are in the plane of the base triangle and the $\vec{z}$ axis oriented towards the surface containing a tracer 4.

In the following equations, formulae and mathematical notations, the receiving (or "detection") fibres 14 correspond hereafter to indices 1 to 3, and have, as coordinates of their respective ends 13, 7:

$$f_1: (0, 0, 0)$$
$$f_2: (a, 0, 0)$$
$$f_3: \left(\frac{a}{2}, \frac{a\sqrt{3}}{2}, 0\right)$$

The emitting (or "illumination") fibre 18 is denoted e, and has, as coordinates of its end 5, 17 e:

$$\left(\frac{a}{2}, \frac{a}{2\sqrt{3}}, 0\right)$$

The position of the centre of the tracer 4 at rest is $b_0$:

$$\left(\frac{a}{2} + \epsilon_1, \frac{a}{2\sqrt{3}} + \epsilon_2, z_0 + \epsilon_3\right)$$

and the current position of the centre of the tracer 4 is b: (x, y, z)

with $\epsilon_i$ (i=1 à 3) being calibration parameters of the fibre of index i and $z_0$ the distance between the tracer and the plane or surface 27 containing the fibres 14.

The light intensity measured for the fibre $f_i$ at rest is denoted $I_{m,i}(0)$.

The light intensity measured for the fibre $f_i$ at any position of the tracer is denoted $I_{m,i}(b)$.

The distance between a fibre i and the tracer 4 is denoted $d(f_i, b)$.

The distance between the emitting fibre 18 and the tracer 4 is denoted d(b, e).

The elastic modulus of compression of the material 3 of the cell 2 in question is denoted K.

The force 11 exerted on the surface of the cell 2 is denoted $\vec{F} = (F_x, F_y, F_z)$.

The following are then obtained:

$$\frac{I_i(b)}{I_i(b_0)} = \frac{(d(f_i, b_0) + d(b_0, e))^2}{(d(f_i, b) + d(b, e))^2}$$

$$(x_m, y_m, z_m) = \underset{b=(x,y,z)}{\mathrm{Argmin}}\left(\sum_{i=1\ldots 3}\left(\frac{I_i(b)}{I_i(b_0)} - \frac{I_{m,i}(b)}{I_{m,i}(0)}\right)^2\right)$$

$$F_x = \frac{x_m - \left(\frac{a}{2} + \epsilon_1\right)}{a} \cdot K$$

$$F_y = \frac{y_m - \left(\frac{a}{2\sqrt{3}} + \epsilon_2\right)}{a} \cdot K$$

$$F_z = \frac{z_m - (z_0 + \epsilon_3)}{h} \cdot K$$

Thus, the unit 10 calculates the three components $F_x$, $F_y$, $F_z$ of the vector $\vec{F}$ and therefore:

the total intensity of the force (modulus of $\vec{F}$), and the direction of $\vec{F}$ (which is a function of the respective sizes of $F_x$, $F_y$, $F_z$).

Each of the cells 2 of the force sensor 1 is calibrated, typically on leaving the factory before being placed on the market. The calculation unit 10 stores the calibrated data $\epsilon_1$, $\epsilon_2$, $\epsilon_3$, a, K tailored to each cell 2. Optionally, the force sensor 1 comprises a temperature probe, and the calculation unit 10 stores the calibrated data $\epsilon_1$, $\epsilon_2$, $\epsilon_3$, a, K tailored to each cell and for different possible temperatures (for example every 0.5° C.), for example between 5° C. and 40° C.

With an example sensor 1 obtained as described previously, the following are noted:

an accuracy of measurement of 0.85 Newton;
a measurement range of from 0 to 40 Newtons,
a measurement error for slightly incorrectly positioned fibres 14 (error in positioning less than five degrees): less than 2%; a measurement error for incorrectly positioned fibres 14 (error in positioning between five and ten degrees): of the order of 7%; however, an incorrect position of the fibres can most often be compensated for by a five-point calibration of measurement 7.

It is noted that it is possible to change the range of measurement of force by changing the material 3, this measurement range depending on the elasticity or rigidity of the material 3 selected.

It is also noted that the sensor 1 comprises very few metal parts (in particular in the case of the array 12 being made of LAP or any other non-ferromagnetic substance), but many parts made of plastic or glass or polymer due to its optical nature. Thus, the sensor 1 is only very slightly sensitive to humidity and is very robust. It can also be used close to strong magnetic fields such as, for example, that of an MRI (each inclusion 4 not being ferromagnetic), in particular by making the diode 23 and the optical detector 9 remote by using long optical fibres 14, 18 (each typically longer than a metre).

Of course, the invention is not limited to the examples which have just be described and numerous adaptations can be made to these examples without exceeding the scope of the invention.

In particular, it is possible to envisage different variants which can be combined with the embodiments and variants described above with reference to FIGS. 1 to 9, and in which:

the sensor 1 can comprise a single cell 2 or a one-dimensional array 12 (line) of cells 2, and/or one or some or each of the cells 2 can be a "multiple" cell which comprises several inclusions 4: such a "multiple" cell makes it possible, by itself, to measure forces in a spatially resolved manner. Such a multiple cell can for example correspond to the sum of all the hexagonal cells 2 of FIG. 1, 2, 7 or 9 but in the case of which the hexagonal walls are removed so as to obtain only a single large cell (not necessarily flat in form). Such a multiple cell can comprise (typically with one source 5 for three measurement points 7 or one measurement point 7 for three sources 5, but not necessarily):

one (or more, for example three or at least three) source(s) 5 for each of its inclusions 4 or one (or more, for example three or at least three) common source(s) 5 for all of its inclusions 4 or one (or more, for example three or at least three) source(s) 5 shared with other cells 2; and one (or more, for example three or at least three) measurement point(s) 7 for each of its inclusions 4 or one (or more, for example three or at least three) common measurement point(s) 7 for all of its inclusions 4 (the differentiation of the different inclusions 4 of this cell 2 being carried out as a function of the location of each "point" of light on the optical sensor 9 and/or by illuminations of the inclusions 4 of this cell with a colour specific to each inclusion) or one (or more, for example three or at least three) measurement point(s) 7 shared with other cells 2; there is preferably at least one (preferably at least three) distinct optical measurement point(s) 7 per inclusion 4 embedded within the filling material 3 of this cell, the at least one (preferably at least three) optical measurement point(s) 7 associated with a given inclusion 4 being arranged in order to capture light originating from this given inclusion 4; and/or the sensor 1 can comprise a single "shared" source 5 which totally and simultaneously illuminates several or all of the cells 2. For example, this source can be an LED with no optical fibre between this LED and the array 12, and/or the sensor 1 can comprise one or more (for example three) "shared" measurement point(s) 7, each measurement point 7 being arranged in order to capture light 8 originating from several or all of the cells 2, the differentiation of the different inclusions 4 of the different cells 2 being carried out as a function of the location of each "point" of light on the optical sensor 9 and/or by illuminations of the cells 2 with a colour specific to each cell 2, and/or at least one illumination fibre can be subdivided so as to have several distal ends (but preferably only a single proximal end), and/or it is possible to have one distinct sensor 9 per detection fibre 14, and/or it is possible to have one distinct generation means 23 per illumination fibre 18, and/or the filling material 3 can be different between different cells 2; this can in particular be useful for a sensor 1 for which it is known that the force intensities will not be uniformly distributed over the sensor 1, and therefore makes it possible to adjust the module K and therefore the force measurement range between different areas or cells 2 of the sensor 1, and/or each cell 2 can comprise less than three measurement points 7. For example, three coloured light sources 5 (per cell 2 or shared by all the cells 2) and a measurement point 7 (per cell 2 or shared by all of the cells 2) would in theory allow triangulation; and/or for each cell 2, the end(s) or measurement point(s) 7, 13 are not necessarily in the same plane 27 as the source(s) or end(s) 5, 17.

Of course, the different characteristics, forms, variants and embodiments of the invention can be associated with each other in various combinations to the extent that they are not incompatible or mutually exclusive.

The invention claimed is:

1. A force sensor (1), comprising:
    a wall (20) comprising an array of measurement cells (2), each measurement cell being filled with a filling material (3) in which at least one inclusion of a substance (4) is embedded, the wall (20) comprising or forming the array (12) of different measurement cells (2), the measurement cells being integral, whereas there is no space between different adjacent measurement cells (2) of the array (12),
    for each measurement cell, at least one light source (5) arranged in order to illuminate the at least one inclusion embedded in said cell,
    for each measurement cell, a measurement system (6) comprising at least one optical measurement point (7) arranged in order to capture light (8) originating from the at least one inclusion embedded in said cell,
    for each measurement cell, means (9, 10) arranged in order to convert optical signals (16) originating from the measurement system of said cell to a signal representative of a force (11) exerted on said cell, the signal being dependent on a movement of the at least one inclusion embedded within the filling material of said cell.

2. The sensor according to claim 1, wherein, for each measurement cell (2), its measurement system comprises at least three distinct optical measurement points (7) arranged in order to capture light (8) originating from the at least one inclusion (4) embedded in said cell.

3. The sensor according to claim 1, wherein the wall (20) comprises a two-dimensional array (12) of the measurement cells.

4. The sensor according to claim 1, wherein the optical measurement point or points (7) of each measurement cell are distinct from the measurement point or points of each of the other measurement cells.

5. The sensor according to claim 1, wherein each optical measurement point comprises a distal end (13) of a detection optical fibre (14).

6. The sensor according to claim 5, wherein each detection optical fibre (14) comprises:
    its distal end (13) oriented towards a measurement cell (2) with which it is associated, and
    a proximal end (15) oriented towards an optical sensor (9) arranged in order to convert an optical signal originating from the detection optical fibre to an electrical signal, the conversion means (9, 10) comprising said optical sensor (9).

7. The sensor according to claim 1, further comprising a distinct light source (5) per measurement cell (2).

8. The sensor according to claim 7, wherein each light source (5) comprises a distal end (17) of an illumination optical fibre (18).

9. The sensor according to claim 8, wherein each illumination optical fibre (18) comprises:
    its distal end (17) oriented towards a measurement cell with which it is associated, and
    a proximal end (19) orientated towards light generation means (23),
    said light generation means being common to all of the illumination optical fibres (18).

10. The sensor according to claim 5, wherein the wall (20) comprises:
    a first face (21) arranged for the exertion of one or more force(s) measured by the force sensor, and
    a second face 22 comprising passages (24) for the insertion of the distal end (13, 17) of each detection (14) and/or illumination (18) optical fibre.

11. The sensor according to claim 1, wherein the signal representative of a force exerted on a measurement cell comprises an intensity of the force and/or a direction of the force.

12. The sensor according to claim 1, wherein the inclusion (4) or at least one of the inclusions or each of the inclusions embedded in each measurement cell is a solid object.

13. The sensor according to claim 1, wherein, for each measurement cell:
    the at least one inclusion (4) embedded in said cell is fluorescent so as to emit an optical fluorescence signal following excitation with an excitation wavelength emitted by the light source(s) (5) arranged in order to illuminate the at least one inclusion embedded in said cell, the fluorescence signal having a fluorescence wavelength distinct from the excitation wavelength,
    the conversion means comprise a filter (25) arranged in order to filter out the excitation wavelength and allow the fluorescence wavelength to pass through.

14. The sensor according to claim 1, wherein the conversion means comprise a single optical sensor (9) for all of the measurement cells, said optical sensor being arranged in order to convert an optical signal originating from any optical measurement point of any measurement cell (2) to an electrical signal.

15. The sensor according to claim 1, wherein the array (12) is produced by 3D printing or from metal.

16. The sensor according to claim 1, wherein the array (12) is cylindrical in form.

17. Method for the measurement of force, comprising:
exertion of a force (11) on a wall (20) comprising an array of measurement cells (2), the force being able to vary from one measurement cell to another, each measurement cell being filled with a filling material (3) in which at least one inclusion of a substance (4) is embedded,
for each measurement cell, illumination of the at least one inclusion embedded in said cell by at least one light source (5),
for each measurement cell, capture of light (8) originating from the at least one inclusion embedded in said cell, by means of a measurement system (6) comprising at least one optical measurement point (7),
for each measurement cell, conversion, by conversion means (9, 10) of the optical signals originating from the measurement system of said cell to a signal representative of a force exerted on said cell, the signal being dependent on a movement of the at least one inclusion embedded within the filling material of said cell.

18. The sensor according to claim 2, wherein the wall (20) comprises a two-dimensional array (12) of measurement cells.

19. The sensor according to claim 2, wherein the optical measurement point or points (7) of each measurement cell are distinct from the measurement point or points of each of the other measurement cells.

20. The sensor according to claim 1, wherein the inclusion (4) or at least one of the inclusions or each of the inclusions embedded in each measurement cell is a bead.

* * * * *